(12) United States Patent
Honda et al.

(10) Patent No.: US 6,940,644 B2
(45) Date of Patent: Sep. 6, 2005

(54) LENS SHEET AND REAR PROJECTION SCREEN INCLUDING THE SAME

(75) Inventors: Makoto Honda, Shinjuku-ku (JP); Katsunori Takahashi, Shinjuku-ku (JP); Hideki Miyata, Shinjuku-ku (JP); Katsunori Shintani, Shinjuku-ku (JP); Yuko Mori, Shinjuku-ku (JP); Toshie Chijiwa, Shinjuku-ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 10/651,206

(22) Filed: Aug. 29, 2003

(65) Prior Publication Data

US 2004/0136064 A1 Jul. 15, 2004

(30) Foreign Application Priority Data

Aug. 30, 2002 (JP) ........................................ 2002-255367

(51) Int. Cl.$^7$ ............................................. G02B 27/22
(52) U.S. Cl. ....................................................... 359/453
(58) Field of Search ................................ 359/452, 453, 359/455, 456, 457, 459, 460; 524/394; 429/40

(56) References Cited

U.S. PATENT DOCUMENTS

| 5,066,099 A | * | 11/1991 | Yoshida et al. ............. 359/457 |
| 5,815,313 A | * | 9/1998 | Mitani et al. .............. 359/448 |
| 6,307,675 B1 | * | 10/2001 | Abe et al. .................. 359/457 |
| 2002/0077402 A1 | * | 6/2002 | Chiang et al. .............. 524/394 |
| 2004/0001993 A1 | * | 1/2004 | Kinkelaar et al. ............ 429/40 |

FOREIGN PATENT DOCUMENTS

| JP | 5-34829 | 2/1993 | ........... G03B/21/62 |
| JP | 5-134318 | 5/1993 | ........... G03B/21/62 |
| JP | 8-190150 | 7/1996 | ........... G03B/21/62 |

* cited by examiner

*Primary Examiner*—Melissa J Koval
(74) *Attorney, Agent, or Firm*—Parkhurst & Wendel, L.L.P.

(57) ABSTRACT

A lens sheet capable of preventing reflection of extraneous light without decreasing extraneous light absorption, having extraneous light absorbers that can be readily formed by printing and are scarcely stained. The present invention also provides a rear projection screen including such a lens sheet. A rear projection screen has a Fresnel lens sheet and a lenticular lens sheet placed on the viewing side of the Fresnel lens sheet. The lenticular lens sheet has lenses formed on those portions of the light-emergent-side surface of the sheet-shaped substrate part through which light converged by other lenses pass, and extraneous light absorbers formed on those portions of the light-emergent-side surface of the sheet-shaped substrate part through which light converged by the other lenses does not pass. Each extraneous light absorber includes a black-colored binder resin and a number of light-diffusing particles subjected to coloring treatment, incorporated in the binder resin.

16 Claims, 2 Drawing Sheets

LENS SHEET AND REAR PROJECTION SCREEN INCLUDING THE SAME

BACKGROUND OF THE INVENTION

1. Field of the Invention

The present invention relates to a rear projection screen for use in a projection-type television or the like, and, more particularly, to a lens sheet such as a lenticular lens sheet that diffuses light entering the lens sheet from the rear side and allows the diffused light to emerge from the lens sheet toward the viewing side, and to a rear projection screen including such a lens sheet.

2. Description of Related Art

Rear projection screens, for which lenticular lens sheets whose base materials are made from synthetic resin materials such as PMMA (polymethyl methacrylate) are used either singly or in combination with other lenses (e.g., Fresnel lenses), have conventionally been known as rear projection screens for use in projection-type televisions or the like.

In general, a lenticular lens sheet for use in such a rear projection screen has lenses formed on the light-incident-side (rear-side) surface and extraneous light absorbers in the shape of stripes formed on those portions of the light-emergent-side (viewing-side) surface through which light (imaging light) converged by the lenses does not pass, so that lowering of image contrast that is caused by extraneous light entering the lenticular lens sheet from the viewing side can be prevented.

The extraneous light absorbers are usually formed with the use of black ink including a black-colored binder resin in which light-diffusing particles are incorporated. Since the black-colored binder resin contains light-diffusing particles, extraneous light that enters the lenticular lens sheet from the viewing side undergoes diffuse reflection. As a result, reflection of extraneous light that occurs on the surfaces of the extraneous light absorbers depending on the position of an extraneous light source or the like is effectively prevented.

However, the above-described conventional lenticular lens sheet has the following problem: since colorless, transparent particles such as silica are used as the light-diffusing particles to be incorporated in the extraneous light absorbers, the black-colored binder resin becomes thin in those spots where the light-diffusing particles are present, and this brings about decrease in extraneous light absorption. For this reason, the image displayed on the screen totally appears whitish brown (color faded) due to the extraneous light diffuse-reflected from the light-diffusing particles. In particular, when a rear projection screen including such a lenticular lens sheet is used in the open air, since extraneous light is strong, light is reflected in a larger amount, and the above-described problem thus becomes conspicuous.

It is possible to solve the above-described problem by incorporating no light-diffusing particles in the black-colored binder resin of the extraneous light absorbers. However, if light-diffusing particles are not incorporated in the black-colored binder resin, reflection of extraneous light heavily occurs on the surfaces of the extraneous light absorbers depending on the position of an extraneous light source or the like, as described above. Moreover, it is not easy to impart thixotropic properties to the binder resin without adding light-diffusing particles, and the binder resin containing no light-diffusing particles is poor in printability. It is therefore extremely difficult to form the extraneous light absorbers by printing with the use of the binder resin containing no light-diffusing particles. In addition, since the extraneous light absorbers made from the binder resin containing no light-diffusing particles have smooth, glossy surfaces, it is easy to recognize the unevenness of coating, and, moreover, the surfaces of these extraneous light absorbers are easily stained with fingerprints or the like.

On the other hand, in a projection-type television now in use, a transparent plastic panel is increasingly placed on the light-emergent side (viewing side) of a lenticular lens sheet as a protective plate for protecting the lenticular lens sheet contained in a rear projection screen.

However, if this lenticular lens sheet has extraneous light absorbers containing light-diffusing particles like the above-described conventional one, the plastic panel is scratched by the light-diffusing particles (by those parts of the light-diffusing particles protruding through the surfaces of the extraneous light absorbers) that come in contact with the plastic panel due to vibration caused while a projection-type television or the like including the lenticular lens sheet is transported.

SUMMARY OF THE INVENTION

The present invention has been accomplished in the light of the above-described drawbacks in the related art. An object of the present invention is to provide a lens sheet, such as a lenticular lens sheet, capable of preventing reflection of extraneous light without decreasing extraneous light absorption, having an extraneous-light absorbing part that can be readily formed by printing and are scarcely stained, and a rear projection screen including such a lens sheet.

Another object of the present invention is to provide a lens sheet, such as a lenticular lens sheet, that can successfully avoid scratching a plastic panel or the like serving as a protective plate even when a projection-type television or the like including the lens sheet is transported, and a rear projection screen including such a lens sheet.

The present invention provides a lens sheet for diffusing light that enters the lens sheet from the rear side and allowing the diffused light to emerge from the lens sheet toward the viewing side, comprising: a sheet-shaped substrate part; a lens part formed on the light-incident-side surface of the sheet-shaped substrate part; and an extraneous-light absorbing part formed on a portion of the light-emergent-side surface of the sheet-shaped substrate part through which light converged by the lenses does not pass; wherein the extraneous-light absorbing part includes a base material, and a plurality of light-diffusing particles subjected to coloring treatment, incorporated in the base material.

In the present invention, the light-diffusing particles are made by dispersing a coloring agent in a base material for the light-diffusing particles, and the content of the coloring agent in each light-diffusing particle is preferably from 1.5 to 55% by weight.

Further, in the present invention, the content of the light-diffusing particles in the extraneous-light absorbing part is preferably from 0.1 to 27.5% by weight.

Furthermore, in the present invention, it is preferable that the base material for the extraneous-light absorbing part has a refractive index nearly equal to that of the light-diffusing particles.

Furthermore, in the present invention, it is preferable that the light-diffusing particles protrude partly through the surface of the base material for the extraneous-light absorbing part. It is herein preferable that the light-diffusing particles have particle diameters 1.25 to 15 times the thickness of the base material for the extraneous-light absorbing part, or particle diameters 2 to 55 µm greater than the thickness of the base material for the extraneous-light absorbing part. In the case where the lens sheet further comprises an optical sheet placed on the viewing side of the light-emergent-side surface of the sheet-shaped substrate part, it is preferable that the light-diffusing particles in the extraneous-light absorbing part have a surface hardness that is lower than that of the surface of the optical sheet that faces the light-emergent-side surface of the sheet-shaped substrate part.

Furthermore, in the present invention, it is preferable that the extraneous-light absorbing part be electrically conductive.

Furthermore, in the present invention, it is preferable that the lens sheet further comprises an electrically conductive layer that impart electrical conductivity to the extraneous-light absorbing part. It is herein preferable that the electrically conductive layer be formed on the surface of the extraneous-light absorbing part, which surface is placed on the side close to the sheet-shaped substrate part.

Furthermore, in the present invention, it is preferable that the lens sheet further comprises a surface layer formed on the surface of the extraneous-light absorbing part, which surface is placed on the side distant from the sheet-shaped substrate part. It is herein preferable that the surface layer be subjected to coloring treatment.

The present invention also provides a rear projection screen comprising the above-described lens sheet.

According to the present invention, the light-diffusing particles, which are contained in the base material for the extraneous-light absorbing part and comprise the binder resin and so on, are subjected to coloring treatment, so that refraction, reflection and absorption of extraneous light are repeatedly caused by the colored, light-diffusing particles in the extraneous-light absorbing part. The amount of light that finally returns to the viewing side from the extraneous-light absorbing part is thus decreased. Namely, not only the base material for the extraneous-light absorbing part but also the light-diffusing particles themselves come to absorb extraneous light, so that it becomes possible to prevent reflection of extraneous light without decreasing extraneous light absorption to give a feeling of higher contrast. Further, since light-diffusing particles are incorporated in the extraneous-light absorbing part, printability, which is essential for the formation of the extraneous-light absorbing part, is excellent as compared with the case where the light-diffusing particles are not incorporated; it is therefore very easy to form the extraneous-light absorbing part by printing.

According to the present invention, it is preferable that the base material for the extraneous-light absorbing part be colored. If it is colored, it is possible to improve contrast without excessively incorporating, in the base material, the light-diffusing particles that have been subjected to coloring treatment.

Further, according to the present invention, if the light-diffusing particles contained in the extraneous-light absorbing part are allowed to protrude partly through the surface of the base material for the extraneous-light absorbing light, the surface of the extraneous-light absorbing part can have fine irregularities to become mat. Consequently, it becomes hard to recognize the unevenness of coating; the reflection of extraneous light comes to be prevented more effectively; and the surface of the extraneous-light absorbing part comes to be scarcely stained with fingerprints or the like.

Furthermore, according to the present invention, if the surface hardness of the light-diffusing particles contained in the extraneous-light absorbing part is made lower than that of the surface, facing the light-emergent-side surface of the sheet-shaped substrate part, of the optical sheet placed on the viewing side of the light-emergent-side surface of the sheet-shaped substrate part, it becomes possible to effectively prevent a plastic panel or the like serving as a protective plate from being scratched by the light-diffusing particles contained in the extraneous-light absorbing part, coming in contact with the plastic panel due to vibration caused while a projection-type television or the like including the lens sheet is transported.

Furthermore, according to the present invention, if the extraneous-light absorbing part is made electrically conductive, it becomes possible to prevent the sheet surface from being covered with dust and thus to avoid the degradation of image quality.

Furthermore, according to the present invention, if a surface layer is formed on the surface of the extraneous-light absorbing part, which surface is placed on the side distant from the sheet-shaped substrate part, it becomes possible to prevent the light-diffusing particles from falling off the extraneous-light absorbing part and, at the same time, to impart, to the sheet surface, hard coat properties and the like.

DETAILED DESCRIPTION OF PREFERRED EMBODIMENTS

By referring to the accompanying drawings, embodiments of the present invention will be described hereinafter.

[First Embodiment]

Figure 1A:
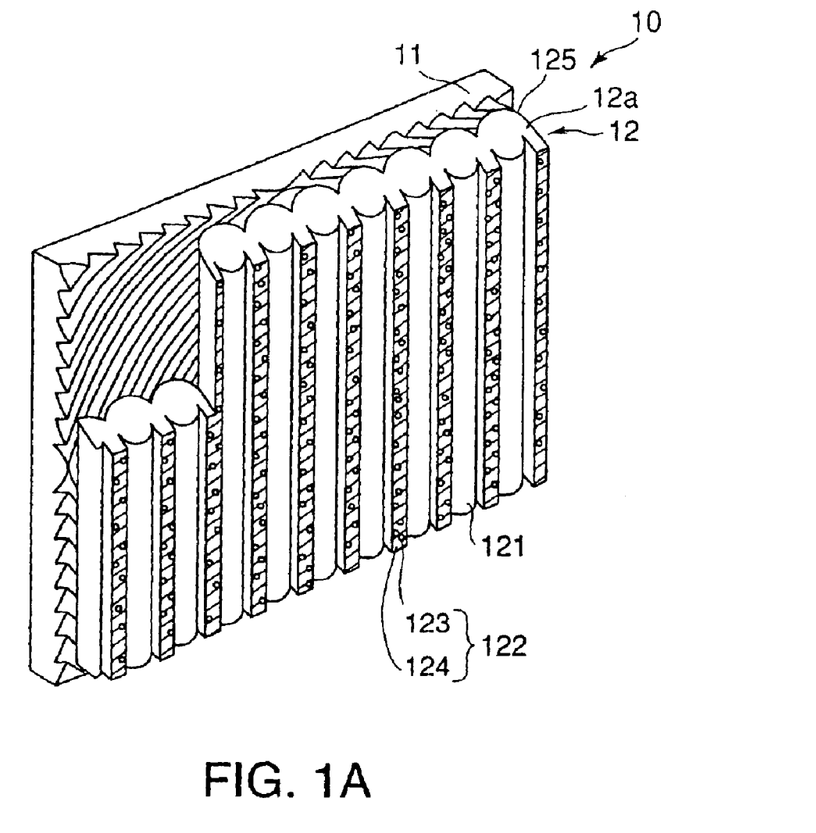
FIG. 1A is a view showing an example of the construction of a rear projection screen including a lenticular lens sheet according to the first embodiment of the present invention.
Figure 1B:
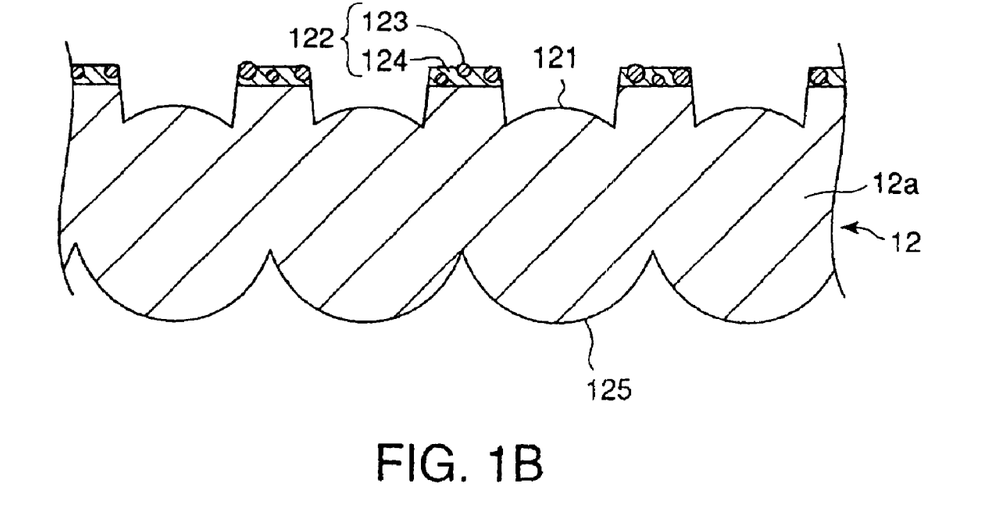
FIG. 1B is a cross-sectional view of the lenticular lens sheet shown in FIG. 1A, enlarged in the direction of thickness.

FIG. 1A is a perspective view showing an example of the construction of a rear projection screen including a lens sheet (lenticular lens sheet) according to the first embodiment of the present invention. FIG. 1B is a cross-sectional view of the lenticular lens sheet shown in FIG. 1A, enlarged in the direction of thickness.

As shown in FIGS. 1A and 1B, a rear projection screen 10 according to the first embodiment of the present invention is composed of a Fresnel lens sheet 11 and a lenticular lens sheet 12 placed on the viewing side of the Fresnel lens sheet 11.

Of these two lens sheets, the lenticular lens sheet 12 is for diffusing light that enters the lens sheet 12 from its rear side and allowing the diffused light to emerge from the lens sheet 12 toward the viewing side, and has a sheet-shaped substrate part 12*a*. On the light-incident-side surface of the sheet-shaped substrate part 12*a*, lenses 125 are formed. Further, lenses 121 are formed on those portions of the light-emergent-side surface of the sheet-shaped substrate part 12*a* through which light converged by the lenses 125 pass, and extraneous light absorbers 122 are formed on those portions of the light-emergent-side surface of the sheet-shaped substrate part 12a through which light converged by the lenses 125 does not pass.

Each extraneous light absorber 122 includes a black-colored binder resin (base material) 124, and a number of light-diffusing particles 123 subjected to coloring treatment, incorporated in the binder resin 124.

The extraneous light absorbers 122 of the lenticular lens sheet 12 will be described in detail hereinafter.

First of all, an explanation will be given on the light-diffusing particles 123, a constituent of the extraneous light absorbers 122.

As mentioned above, the light-diffusing particles 123 to be incorporated in the binder resin 124 of the extraneous light absorbers 122 are subjected to coloring treatment so that the above-described effects can be obtained. The light-diffusing particles 123 may be pigmented to any color, and, moreover, the material and size (particle diameter) of the light-diffusing particles 123 are not limited to specific ones. A variety of embodiments as described below are acceptable for the light-diffusing particles 123.

For example, the light-diffusing particles 123 may be made by dispersing a coloring agent in a base material for the light-diffusing particles in such an amount that the content of the coloring agent (the percentage of the coloring agent to the whole of the light-diffusing particles) is from 1.5 to 55% by weight. It is unfavorable that the content of the coloring agent is less than 1.5% by weight because, in this case, the light-diffusing particles 123 are scarcely colored, that is, they remain transparent, so that those spots where the light-diffusing particles 123 are present may be recognized as pinholes. It is also unfavorable that the content of the coloring agent is more than 55% by weight because, in this case, the surfaces of the light-diffusing particles 123 can feel rough.

Examples of base materials for the light-diffusing particles 123 include acrylic resins such as methyl methacrylate resins and copolymers thereof, styrene-containing resins such as styrene resins and copolymers thereof, urethane-containing resins such as urethane resins and copolymers thereof, polyester resins such as polycarbonate and PET (polyethylene terephthalate), vinyl chloride resins, and fluororesins. In addition, inorganic materials such as glass may be used as the base material for the light-diffusing particles.

A variety of conventionally known pigments and dyes can be used for the coloring agent that is dispersed in the base material for the light-diffusing particles 123. It is, however, particularly preferable to use carbon black. This is because, to fully obtain the above-described effects, it is preferable to blacken the light-diffusing particles 123, and the light-diffusing particles 123 can be readily pigmented to black with the use of carbon black. Besides such a coloring agent, a dispersing agent, a stabilizing agent, a wetting agent, and the like, may also be added properly.

The light-diffusing particles 123 may be in any size (particle diameter). However, when the binder resin 124 is taken into consideration, the particle diameters of the light-diffusing particles 123 are preferably from 2 to 120 $\mu$m, more preferably from 5 to 80 $\mu$m.

Moreover, the light-diffusing particles 123 can have any refractive index. It is, however, preferable that the refractive index of the light-diffusing particles 123 be nearly equal to that of the binder resin 124. Specifically, it is preferable that the difference between the refractive index of the light-diffusing particles 123 and that of the binder resin 124 be from 0 to 0.1, for example. If the two refractive indices are so made, the extraneous light absorbers 122 can entirely have an almost uniform refractive index, and the reflection between the light-diffusing particles 123 and the binder resin 124 can thus be reduced to increase the extraneous light absorption efficiency.

The content of the light-diffusing particles 123 in the binder resin 124 of the extraneous light absorbers 122 (the percentage of the light-diffusing particles to the whole of the extraneous light absorbers) is also not limited to any specific value. It is, however, preferable to make the content of the light-diffusing particles 123 from 0.1 to 27.5% by weight. It is unfavorable that the content of the light-diffusing particles 123 is less than 0.1% by weight because, in this case, the expected effects of the light-diffusing particles on the prevention of reflection of extraneous light may not be fully obtained, and the quality of the rear projection screen can thus be degraded. On the other hand, when the content of the light-diffusing particles 123 is made more than 27.5% by weight, the diffuse reflection of extraneous light is increased. As a result, the image displayed appears whitish brown, and image quality is thus impaired. In addition, the surfaces of the extraneous light absorbers 122 feel rough, so that the quality of the rear projection screen is degraded.

It is preferable to make the light-diffusing particles 123 protrude partly through the surface of the binder resin 124 of the extraneous light absorbers 122, as shown in FIG. 1B. If the light-diffusing particles 123 are so incorporated, the surfaces of the extraneous light absorbers 122 can have fine irregularities to become mat. As a result, it becomes difficult to recognize the unevenness of coating; the reflection of extraneous light comes to be prevented more effectively; and the surfaces of the extraneous light absorbers 122 come to be scarcely stained with fingerprints or the like.

To allow the light-diffusing particles 123 to protrude partly through the surface of the binder resin 124 of the extraneous light absorbers 122, it is preferable to decide the particle diameters of the light-diffusing particles 123 on the basis of the thickness of the binder resin 124. Specifically, it is preferable that the light-diffusing particles 123 have particle diameters 1.25 to 15 times the thickness of the binder resin 124. Alternatively, the light-diffusing particles 123 may have particle diameters 2 to 55 $\mu$m greater than the thickness of the binder resin 124. If the relationship between the particle diameters of the light-diffusing particles 123 and the thickness of the binder resin 124 is made as described above, the above-described effects can be fully obtained.

Figure 2:
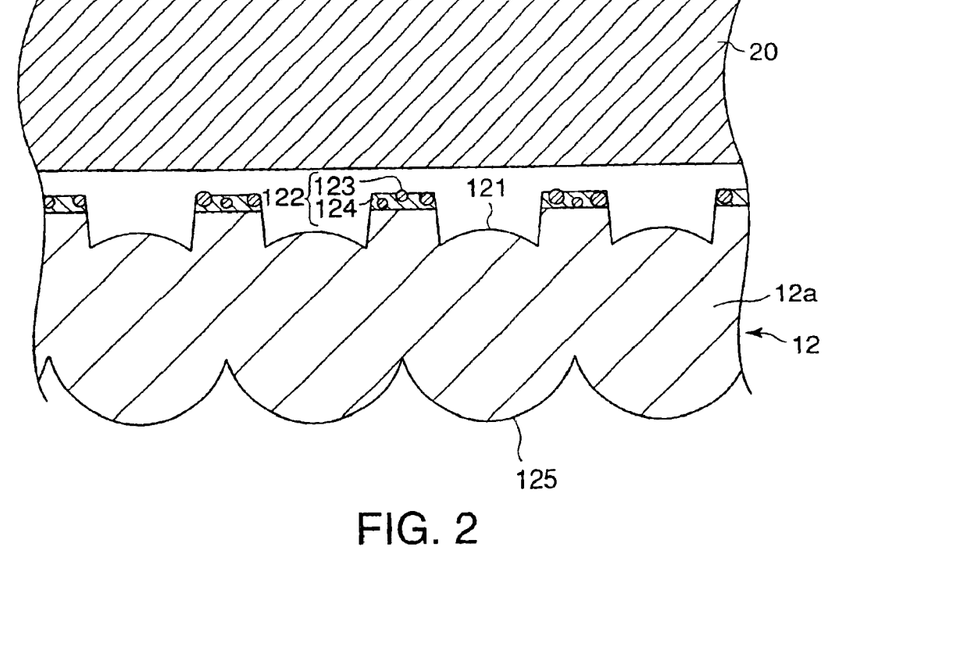
FIG. 2 is a cross-sectional view of a combination of the lenticular lens sheet shown in FIGS. 1A and 1B and an optical sheet, enlarged in the direction of thickness.

In the rear projection screen 10 shown in FIG. 1A, an optical sheet 20 may be placed, as shown in FIG. 2, on the viewing side of the lenticular lens sheet 12. This optical sheet 20 is composed of a substantially transparent sheet, or a sheet or lens sheet having light diffusers.

In this case, it is preferable that the light-diffusing particles 123 contained in the extraneous light absorbers 122 formed on the light-emergent-side surface of the sheet-shaped substrate part 12a of the lenticular lens sheet 12 have a surface hardness lower than that of the surface of the optical sheet 20 that faces the light-emergent-side surface of the sheet-shaped substrate part 12a. If the surface hardness of the light-diffusing particles 123 is so controlled, it is possible to effectively prevent the optical sheet 20 from being scratched by the light-diffusing particles 123 contained in the extraneous light absorbers 122, coming in contact with the optical sheet 20 due to vibration caused while a projection-type television or the like including the lenticular lens sheet 12 is transported.

For the optical sheet 20, an acrylic plate or MS board (PMMA-styrene copolymer) is often used. It is therefore convenient to make the light-diffusing particles 123 from one of the above-described acrylic resins and urethane-containing resins.

Next, the binder resin 124 constituting the extraneous light absorbers 122 of the lenticular lens sheet 12 will be described.

Any of those binder resins that have conventionally been used to form extraneous light absorbers (so-called black stripes) can be used as the binder resin 124. Specific examples of binder resins useful herein include binder resins obtained by dispersing chipped carbon black in acrylic or epoxy resins.

Any of a variety of conventionally known methods can be employed as a method for forming the extraneous light absorbers 122 including the above-described light-diffusing particles 123 and binder resin 124. Specifically, such a method as an offset gravure or screen printing method can be used. Of these printing methods, an offset gravure printing method is preferred because printing can be inexpensively and simply conducted by this method.

According to the first embodiment of the present invention, the light-diffusing particles 123 contained in the binder resin 124 of the extraneous light absorbers 122 have been subjected to coloring treatment, so that refraction, reflection and absorption of extraneous light are repeatedly caused by the colored light-diffusing particles 123 in the extraneous light absorbers 122. The amount of light that finally returns to the viewing side from the extraneous light absorbers 122 can thus be decreased. Namely, not only the binder resin 124 of the extraneous light absorbers 122 but also the light-diffusing particles 123 themselves come to absorb extraneous light, so that it becomes possible to prevent reflection of extraneous light without decreasing extraneous light absorption to give a feeling of higher contrast. Further, since the light-diffusing particles 123 are incorporated in the extraneous light absorbers 122, printability, which is essential for the formation of the extraneous light absorbers, is excellent as compared with the case where the light-diffusing particles 123 are not incorporated; it is therefore very easy to form the extraneous light absorbers 122 by printing.

Further, according to the first embodiment of the present invention, since the binder resin 124 of the extraneous light absorbers 122 is colored, it is possible to improve contrast without excessively adding, to the binder resin 124, the light-diffusing particles 123 that have been subjected to coloring treatment.

In the aforementioned first embodiment, the Fresnel lens sheet 11 and the lenticular lens sheet 12 that constitute the rear projection screen 10 are separate sheets. However, these two sheets may be formed integrally; or the Fresnel lens sheet 11 may be omitted.

Further, in the above-described first embodiment, the binder resin 124 is pigmented to black. However, in the case where a large amount of the light-diffusing particles 123 are added to the binder resin 124, a non-colored resin can also be used as the binder resin 124.

[Second Embodiment]

Next, a lens sheet (lenticular lens sheet) according to the second embodiment of the present invention will be described with reference to FIG. 3. The second embodiment of the present invention is the same as the aforementioned first embodiment, except that an electrically conductive layer and a surface layer are formed as the lower and upper layers of each extraneous light absorber, respectively. In the description of the second embodiment, the same reference numerals as those in the first embodiment are used to designate the corresponding parts, and detailed descriptions for these parts are omitted.

Figure 3:
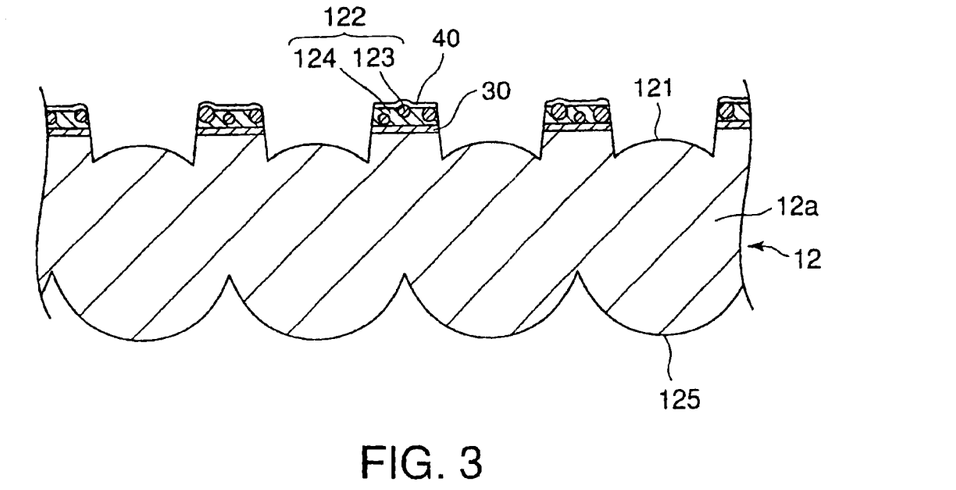
FIG. 3 is a cross-sectional view of a lenticular lens sheet according to the second embodiment of the present invention, enlarged in the direction of thickness.

As shown in FIG. 3, a lenticular lens sheet 12 according to the second embodiment of the present invention contains electrically conductive layers 30 that are formed on the surfaces of the extraneous light absorbers 122 on the side close to the sheet-shaped substrate part 12a. If the electrically conductive layers 30 are so formed, it is possible to impart electrical conductivity to the extraneous light absorptive layers including the extraneous light absorbers 122.

Taken now as an example is the case where the binder resin 124 of the extraneous light absorbers 122 is made by dispersing chipped carbon black in an acrylic resin. In this case, in order to increase the blackness of the binder resin 124 of the extraneous light absorbers 122, it is necessary to disperse, in the acrylic resin, carbon black uniformly and extremely finely.

However, the binder resin 124 containing such highly dispersed carbon black is to have lowered electrical conductivity, so that the lenticular lens sheet 12 has an increased surface resistance value. Therefore, the surface of the lenticular lens sheet 12 tends to be covered with dust to impair image quality. In general, it is possible to avoid such a trouble by dispersing antistatic agents comprising surface active agents or electrically conductive fine particles such as tin oxide in the binder resin 124 to impart electrical conductivity to the extraneous light absorbers 122. However, when such a material is added to the binder resin 124, the degree of dispersion of carbon black in the binder resin 124 becomes, in certain cases, lower to decrease the blackness of the binder resin 124.

In the lenticular lens sheet 12 shown in FIG. 3, since electrically conductive layers 30 are formed as the lower layers of the extraneous light absorbers 122, it is possible to impart electrical conductivity to the extraneous light absorptive layers including the extraneous light absorbers 122 without decreasing the blackness of the extraneous light absorbers 122 themselves. The electrically conductive layers 30 can be made from a resin, in which carbon black poor in dispersibility, fine metallic particles, an electrically conductive polymer, or the like is dispersed.

Further, as shown in FIG. 3, surface layers 40 are formed on the surfaces of the extraneous light absorbers 122 on the side distant from the sheet-shaped substrate part 12a. If the surface layers 40 are so formed, it becomes possible to prevent the light-diffusing particles 123 from falling off the extraneous light absorbers 122.

In the case where an optical sheet 20 such as a substantially transparent sheet or a sheet or lens sheet having light diffusers is placed, as shown in FIG. 2, on the viewing side of the above-described lenticular lens sheet 12, it is preferable to make the surface hardness of the surface layers 40 lower than that of the surface of the optical sheet 20 that faces the light-emergent-side surface of the sheet-shaped substrate part 12a, or to incorporate an additive having lubricating properties such as silicone in the surface layers 40. The surface layers 40 may be either transparent or colored.

As mentioned above, according to the second embodiment of the present invention, since electrical conductivity is imparted to the extraneous light absorptive layers including the extraneous light absorbers 122 by forming the electrically conductive layers 30 as the lower layers of the extraneous light absorbers 122, the surface of the lenticular lens sheet 12 is scarcely covered with dust, and degradation of image quality can thus be avoided.

Further, according to the second embodiment of the present invention, since the surface layers 40 are formed as the upper layers of the extraneous light absorbers 122, it is possible to prevent the light-diffusing particles 123 from falling off the extraneous light absorbers 122 and, at the same time, to impart, to the sheet surface, hard coat properties and the like.

In the above-described second embodiment, electrical conductivity is imparted to the extraneous light absorptive layers including the extraneous light absorbers 122 by forming the electrically conductive layers 30 as the lower layers of the extraneous light absorbers 122. However, in the case where the binder resin 124 does not lose its blackness even when antistatic agents comprising surface active agents or electrically conductive fine particles such as tin oxide are added to the binder resin 124, the extraneous light absorbers 122 themselves may be made electrically conductive.

In the above-described first and second embodiments, the construction of the lenticular lens sheet 12 is not limited to the above-described one, and the construction of those parts other than the extraneous light absorbers 122 may be freely selected. Specifically, for example, in the above-described first and second embodiments, a lenticular lens sheet of double-side lens type having lenses 125 on the light-incident-side surface of a sheet-shaped substrate part 12a and lenses 121 on the light-emergent-side surface of the substrate part 12a is taken as the lenticular lens sheet 12. However, the present invention is not limited to this and is also applicable to a lenticular lens sheet of one-side lens type in which the light-emergent-side surface of a sheet-shaped substrate part 12a is flat.

EXAMPLES

The above-described first and second embodiments of the present invention will now be explained more specifically by referring to the following Examples.

Example 1

A lenticular lens sheet of Example 1 corresponds to that of the first embodiment of the present invention, and has extraneous light absorbers formed with the use of black ink prepared by incorporating colored light-diffusing particles in a binder resin.

An acrylic resin in which 24% by weight of chipped carbon black had been dispersed was used as the binder resin of the extraneous light absorbers. Cross-linked acrylic beads with a particle diameter of 13 μm, containing 8% by weight of carbon black, were used as the light-diffusing particles to be incorporated in the binder resin. The content of the light-diffusing particles in the binder resin was made 2%.

To those portions of the light-emergent-side surface of a lenticular lens sheet of double-side lens type on which the extraneous light absorbers were supposed to be formed, the binder resin containing the above-described light-diffusing particles was applied at a thickness of 6 μm by printing using an offset gravure printing method to form the extraneous light absorbers.

The lenticular lens sheet thus produced was combined with a Fresnel lens sheet and a transparent plastic plate serving as a protective plate to obtain a rear projection screen of Example 1.

Example 2

A lenticular lens sheet of Example 2 corresponds to that of the first embodiment of the present invention, and, like the lenticular lens sheet of Example 1, has extraneous light absorbers formed with the use of black ink prepared by incorporating colored light-diffusing particles in a binder resin.

A urethane-acrylic resin in which 30% by weight of chipped carbon black had been dispersed was used as the binder resin of the extraneous light absorbers. Cross-linked urethane beads with a particle diameter of 45 μm, containing 20% by weight of carbon black, were used as the light-diffusing particles to be incorporated in the binder resin. The content of the light-diffusing particles in the binder resin was made 10%.

To those portions of the light-emergent-side surface of a lenticular lens sheet of double-side lens type on which the extraneous light absorbers were supposed to be formed, the binder resin containing the above-described light-diffusing particles was applied at a thickness of 10 μm by printing using a screen printing method to form the extraneous light absorbers.

The lenticular lens sheet thus produced was combined with a Fresnel lens sheet and a transparent plastic plate serving as a protective plate to obtain a rear projection screen of Example 2.

Example 3

A lenticular lens sheet of Example 3 corresponds to that of the second embodiment of the present invention, and has, in addition to extraneous light absorbers formed with the use of black ink prepared by incorporating colored light-diffusing particles in a binder resin, electrically conductive layers for imparting electrical conductivity to the extraneous light absorbers.

An acrylic resin in which 25% by weight of chipped carbon black had been dispersed was used as the binder resin of the extraneous light absorbers. Cross-linked acrylic beads with a particle diameter of 20 μm, containing 15% by weight of carbon black, were used as the light-diffusing particles to be incorporated in the binder resin. The content of the light-diffusing particles in the binder resin was made 15%.

On the other hand, an acrylic resin in which 33% by weight of carbon black had been dispersed was used as a material for the electrically conductive layers.

To those portions of the light-emergent-side surface of a lenticular lens sheet on which the extraneous light absorbers were supposed to be formed, the material for the electrically conductive layers was applied at a thickness of 3 μm by printing using an offset gravure printing method to form the electrically conductive layers.

Subsequently, on the surfaces of the electrically conductive layers thus formed, the extraneous light absorbers with a thickness of 8 μm were formed by an offset gravure printing method.

The lenticular lens sheet thus produced was combined with a Fresnel lens sheet and a transparent plastic plate serving as a protective plate to obtain a rear projection screen of Example 3.

Example 4

A lenticular lens sheet of Example 4 corresponds to that of the first embodiment of the present invention, and has extraneous light absorbers formed with the use of black ink prepared by incorporating colored light-diffusing particles in a binder resin.

An epoxy resin in which 18% by weight of chipped carbon black had been dispersed was used as the binder resin of the extraneous light absorbers. Cross-linked acryl-butadiene copolymeric rubber beads with a particle diameter of 55 μm, containing 25% by weight of carbon black, were used as the light-diffusing particles to be incorporated in the binder resin. The content of the light-diffusing particles in the binder resin was made 1.5%.

To those portions of the light-emergent-side surface of a lenticular lens sheet of double-side lens type on which the extraneous light absorbers were supposed to be formed, the binder resin containing the above-described light-diffusing particles was applied at a thickness of 10 µm by printing using a screen printing method to form the extraneous light absorbers.

The lenticular lens sheet thus produced was combined with a Fresnel lens sheet and a transparent plastic plate serving as a protective plate to obtain a rear projection screen of Example 4.

Example 5

A lenticular lens sheet of Example 5 corresponds to that of the second embodiment of the present invention, and has, in addition to extraneous light absorbers formed with the use of black ink prepared by incorporating colored light-diffusing particles in a binder resin, surface layers for protecting the extraneous light absorbers.

A urethane-acrylic resin in which 30% by weight of chipped carbon black had been dispersed was used as the binder resin of the extraneous light absorbers. Cross-linked urethane beads with a particle diameter of 45 µm, containing 8% by weight of carbon black, were used as the light-diffusing particles to be incorporated in the binder resin. The content of the light-diffusing particles in the binder resin was made 10%.

On the other hand, electron-beam-curing, transparent urethane ink was used as a material for the surface layers.

To those portions of the light-emergent-side surface of a lenticular lens sheet of double-lens type on which the extraneous light absorbers were supposed to be formed, the binder resin containing the above-described light-diffusing particles were applied at a thickness of 10 µm by printing using a screen printing method to form the extraneous light absorbers.

Subsequently, to the surfaces of the extraneous light absorbers thus formed, the material for the surface layers was applied at a thickness of 2 µm by printing using an offset gravure printing method, and was then cured by the application of an electron beam to form the surface layers.

The lenticular lens sheet thus produced was combined with a Fresnel lens sheet and a transparent plastic plate serving as a protective plate to obtain a rear projection screen of Example 5.

Example 6

A lenticular lens sheet of Example 6 corresponds to that of the second embodiment of the present invention, and has, in addition to extraneous light absorbers formed with the use of black ink prepared by incorporating colored light-diffusing particles in a binder resin, electrically conductive layers for imparting electrical conductivity to the extraneous light absorbers and surface layers for protecting the extraneous light absorbers.

An acrylic resin in which 25% by weight of chipped carbon black had been dispersed was used as the binder resin of the extraneous light absorbers. Cross-linked acryl-butadiene copolymeric rubber beads with a particle diameter of 20 µm, containing 25% by weight of carbon black, were used as the light-diffusing particles to be incorporated in the binder resin. The content of the light-diffusing particles in the binder resin was made 15%.

On the other hand, an acrylic resin in which 40% by weight of carbon black had been dispersed was used as a material for the electrically conductive layers, while electron-beam-curing, transparent urethane ink was used as a material for the surface layers.

To those portions of the light-emergent-side surface of a lenticular lens sheet on which the extraneous light absorbers were supposed to be formed, the material for the electrically conductive layers was applied at a thickness of 3 µm by printing using an offset gravure printing method to form the electrically conductive layers.

Subsequently, on the surfaces of the electrically conductive layers thus formed, the extraneous light absorbers with a thickness of 8 µm were formed by an offset gravure printing method.

Thereafter, to the surfaces of the extraneous light absorbers thus formed, the material for the surface layers was applied at a thickness of 2 µm by printing using an offset gravure printing method, and was then cured by the application of an electron beam to form the surface layers.

The lenticular lens sheet thus produced was combined with a Fresnel lens sheet and a transparent plastic plate serving as a protective plate to obtain a rear projection screen of Example 6.

Example 7

A lenticular lens sheet of Example 7 corresponds to that of the first embodiment of the present invention, and has extraneous light absorbers formed with the use of black ink prepared by incorporating colored light-diffusing particles in a binder resin.

An acrylic resin in which 24% by weight of chipped carbon black had been dispersed was used as the binder resin of the extraneous light absorbers. Cross-linked styrene beads with a particle diameter of 13 µm, containing 8% by weight of carbon black, were used as the light-diffusing particles to be incorporated in the binder resin. The content of the light-diffusing particles in the binder resin was made 2%.

To those portions of the light-emergent-side surface of a lenticular lens sheet of double-side lens type on which the extraneous light absorbers were supposed to be formed, the binder resin containing the above-described light-diffusing particles was applied at a thickness of 6 µm by printing using an offset gravure printing method to form the extraneous light absorbers.

The lenticular lens sheet thus produced was combined with a Fresnel lens sheet and a transparent plastic plate serving as a protective plate to obtain a rear projection screen of Example 7.

Comparative Example 1

An acrylic resin in which 24% by weight of chipped carbon black had been dispersed was used as the binder resin for forming the extraneous light absorbers. Transparent, cross-linked acrylic beads with a particle diameter of 13 µm were used as the light-diffusing particles to be incorporated in the binder resin. The content of the light-diffusing particles in the binder resin was made 15%.

To those portions of the light-emergent-side surface of a lenticular lens sheet of double-side lens type on which the extraneous light absorbers were supposed to be formed, the binder resin containing the above-described light-diffusing particles was applied at a thickness of 6 µm by printing using an offset gravure printing method to form the extraneous light absorbers.

The lenticular lens sheet thus produced was combined with a Fresnel lens sheet and a transparent plastic plate serving as a protective plate to obtain a rear projection screen of Comparative Example 1.

Comparative Example 2

An acrylic resin in which 25% by weight of chipped carbon black had been dispersed was used as the binder resin of the extraneous light absorbers. Transparent glass beads with a particle diameter of 20 μm were used as the light-diffusing particles to be incorporated in the binder resin. The content of the light-diffusing particles in the binder resin was made 15%.

To those portions of the light-emergent-side surface of a lenticular lens sheet of double-side lens type on which the extraneous light absorbers were supposed to be formed, the binder resin containing the above-described light-diffusing particles was applied at a thickness of 8 μm by printing using an offset gravure printing method to form the extraneous light absorbers.

The lenticular lens sheet thus produced was combined with a Fresnel lens sheet and a transparent plastic plate serving as a protective plate to obtain a rear projection screen of Comparative Example 2.

Comparative Example 3

An acrylic resin in which 24% by weight of chipped carbon black had been dispersed was used as the binder resin of the extraneous light absorbers. Light-diffusing particles were not incorporated in the binder resin at all.

To those portions of the light-emergent-side surface of a lenticular lens sheet of double-side lens type on which the extraneous light absorbers were supposed to be formed, the above-described binder resin was applied at a thickness of 6 μm by printing using an offset gravure printing method to form the extraneous light absorbers.

The lenticular lens sheet thus produced was combined with a Fresnel lens sheet and a transparent plastic plate serving as a protective plate to obtain a rear projection screen of Comparative Example 3.

(Results of Evaluation)

The rear projection screens of Examples 1 to 7 and Comparative Examples 1 to 3 were subjected to the following six evaluation tests: "evaluation of contrast," "evaluation of printability," "evaluation of stain resistance," "antistatic properties," "evaluation of friction with a transparent plate, etc.", and "falling of beads due to friction." The results of these evaluation tests are shown in Table 1.

In the "evaluation of contrast," the contrast of the image displayed on the rear projection screen was visually evaluated in the presence of extraneous light. In the table, "O" means that the contrast is excellent; and "x" means that the contrast is poor.

In the "evaluation of printability," the easiness of printing upon forming the extraneous light absorbers by printing was evaluated. In the table, "O" means that it was easy to conduct printing; and "x" means that it was not easy to conduct printing.

In the "evaluation of stain resistance," how easily the extraneous light absorbers were stained with fingerprints was visually evaluated by touching them with fingers. In the table, "O" means that the extraneous light absorbers were scarcely stained with fingerprints, that is, no stains were confirmed; and "x" means that the extraneous light absorbers were stained with fingerprints, that is, stains were confirmed.

In the "antistatic properties" test, the surface resistance value of the lenticular lens sheet was measured. In the table, "O" means that the surface resistance value is less than $10^{12}$ Ω; and "x" means that the surface resistance value is $10^{12}$ Ω or more. The antistatic properties may also be evaluated by the following method: after leaving the rear projection screen as it is, the degree to which the surface of the rear projection screen has been covered with dust is checked. In the evaluation using the latter method, those rear projection screens that are evaluated as "x" in the former test are heavily covered with dust.

In the "evaluation of friction with a transparent plate, etc.", it was visually confirmed whether the surface of a transparent plate or the like placed on the front surface of the rear projection screen was scratched or not while a television set including the rear projection screen was practically transported. In this evaluation test, an ordinary PMMA-made plate was used as the substrate part of the lenticular lens sheet. In the table, "O" means that the surface of the transparent plate was not scratched; and "x" means that the surface of the transparent plate was scratched.

In the "evaluation of falling of beads due to friction," it was visually confirmed whether the light-diffusing particles fell off the extraneous light absorbers or not when the surface of the lenticular lens sheet in the rear projection screen was rubbed 30 times (1 time per second) with a plastic plate having roughened surfaces, loaded with a force of 100 g/cm². In the table, "O" means that the light-diffusing particles did not fall; and "x" means that the light-diffusing particles fell.

TABLE 1

| | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Evaluation of Contrast | o | o | o | o | o | o | o | x | x | x |
| Evaluation of Printability | o | o | o | o | o | o | o | o | o | x |
| Evaluation of Stain Resistance | o | o | o | o | o | o | o | o | o | x |
| Antistatic Proparties | x | x | o | x | x | o | o | x | x | x |
| Evaluation of Friction with Transparent Plate, etc. | o | o | o | o | o | o | o | o | x | o |

TABLE 1-continued

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Evaluation of Falling of Beads due to Friction | x | x | x | x | ○ | ○ | ○ | x | x | — |

As is clear also from the above Table 1, in the evaluation of contrast, all of the rear projection screens of Examples 1 to 7 were found excellent. On the contrary, the images displayed on the rear projection screens of Comparative Examples 1 and 2 appeared whitish brown due to extraneous light because the light-diffusing particles used were transparent. Moreover, those spots in the extraneous light absorbers where the light-diffusing particles were present were poor in blackness, so that they were recognized as pinholes. Further, on the rear projection screen of Comparative Example 3, reflection of extraneous light strongly occurred because no light-diffusing particles were present in this screen.

Also in the evaluation of printability, the rear projection screens of Examples 1 to 7 were found excellent. On the contrary, in the rear projection screen of Comparative Example 3 (a rear projection screen containing no light-diffusing particles), since the binder resin did not spread well, the surfaces of the extraneous light absorbers were lacking in evenness, and the screen thus had a poor appearance.

Also in the evaluation of stain resistance, the rear projection screens of Examples 1 to 7 were found excellent because they had irregularities on their surfaces. On the contrary, the rear projection screen of Comparative Example 3 (containing no light-diffusing particles) was stained clearly with fingerprints.

Regarding antistatic properties, since electrically conductive layers were present in the rear projection screens of Examples 3 and 6, the surfaces of the lenticular lens sheets contained in these screens had a surface resistance of $10^{11}$ Ω and were thus scarcely covered with dust. On the other hand, it was confirmed that the surfaces of the rear projection screens of Comparative Examples 1 to 3, containing no electrically conductive layers, were covered with dust due to static electricity.

Also in the evaluation of friction with a transparent plate, etc., the rear projection screens of Examples 1 to 7 were found excellent (the transparent plates, etc. were not scratched), and those rear projection screens (of Examples 4 and 6) including, as the light-diffusing particles, cross-linked acryl-butadiene copolymeric rubber beads were found particularly excellent. On the contrary, the rear projection screen (of Comparative Example 2) including, as the light-diffusing particles, glass beads severely scratched the surface of the protective plate placed on this screen.

In the evaluation of falling of beads due to friction, falling of the light-diffusing particles was not confirmed when the rear projection screens of Examples 5 and 6 were tested because surface layers were present in these screens. On the contrary, falling of the light-diffusing particles was confirmed when the rear projection screens of Comparative Examples 1 to 3 were tested.

What is claimed is:

1. A lens sheet for diffusing light that enters the lens sheet from a rear side and allowing the diffused light to emerge from the lens sheet toward a viewing side, comprising:
   a sheet-shaped substrate part;
   a lens part formed on a light-incident-side surface of the sheet-shaped substrate part; and
   an extraneous-light absorbing part formed on a portion of the light-emergent-side surface of the sheet-shaped substrate part through which light converged by the lens part does not pass;
   wherein
   (1) the extraneous-light absorbing part includes a base material, and a plurality of light-diffusing particles subjected to coloring treatment, incorporated in the base material, and
   (2) light-diffusing particles are made by dispersing a coloring agent in a base material for the light-diffusing particles; and a content of the coloring agent in each light-diffusing particle is from 1.5 to 55% by weight.

2. The lens sheet according to claim 1, wherein the light-diffusing particles protrude partly through a surface of the base material for the extraneous-light absorbing part.

3. The lens sheet according to claim 2, wherein the light-diffusing particles have particle diameters 1.25 to 15 times a thickness of the base material for the extraneous-light absorbing part.

4. The lens sheet according to claim 2, wherein the light-diffusing particles have particle diameters 2 to 55 μm greater than a thickness of the base material for the extraneous-light absorbing part.

5. The lens sheet according to claim 2, further comprising an optical sheet placed on the viewing side of the light-emergent-side surface of the sheet-shaped substrate part;
   wherein the light-diffusing particles in the extraneous-light absorbing part have a surface hardness that is lower than that of a surface of the optical sheet that faces the light-emergent-side surface of the sheet-shaped substrate part.

6. The lens sheet according to claim 1, wherein the extraneous-light absorbing part is electrically conductive.

7. The lens sheet according to claim 1, further comprising a surface layer formed on a surface of the extraneous-light absorbing part, which surface is placed on a side distant from the sheet-shaped substrate part.

8. The lens sheet according to claim 7, wherein the surface layer is subjected to coloring treatment.

9. A rear projection screen comprising a lens sheet as set forth in claim 1.

10. A lens sheet for diffusing light that enters the lens sheet from a rear side and allowing the diffused light to emerge from the lens sheet toward a viewing side, comprising:
    a sheet-shaped substrate part;
    a lens part formed on a light-incident-side surface of the sheet-shaped substrate part; and
    an extraneous-light absorbing part formed on a portion of the light-emergent-side surface of the sheet-shaped substrate part through which light converged by the lens part does not pass;

wherein
- (1) the extraneous-light absorbing part includes a base material, and a plurality of light-diffusing particles subjected to coloring treatment, incorporated in the base material, and
- (2) a content of the light-diffusing particles in the extraneous-light absorbing part is from 0.1 to 27.5% by weight.

11. A lens sheet for diffusing light that enters the lens sheet from a rear side and allowing the diffused light to emerge from the lens sheet toward a viewing side, comprising:
- a sheet-shaped substrate part;
- a lens part formed on a light-incident-side surface of the sheet-shaped substrate part; and
- an extraneous-light absorbing part formed on a portion of the light-emergent-side surface of the sheet-shaped substrate part through which light converged by the lens part does not pass;

wherein
- (1) the extraneous-light absorbing part includes a base material, and a plurality of light-diffusing particles subjected to coloring treatment, incorporated in the base material, and
- (2) the base material for the extraneous-light absorbing part has a refractive index nearly equal to that of the light-diffusing particles.

12. A lens sheet for diffusing light that enters the lens sheet from a rear side and allowing the diffused light to emerge from the lens sheet toward a viewing side, comprising:
- a sheet-shaped substrate part;
- a lens part formed on a light-incident-side surface of the sheet-shaped substrate part;
- an electrically conductive extraneous-light absorbing part formed on a portion of the light-emergent-side surface of the sheet-shaped substrate part through which light converged by the lens part does not pass; and
- an electrically conductive layer that imparts electrical conductivity to the extraneous-light absorbing part,
- wherein the extraneous-light absorbing part includes a base material, and a plurality of light-diffusing particles subjected to coloring treatment, incorporated in the base material.

13. The lens sheet according to claim 12, wherein the electrically conductive layer is formed on a surface of the extraneous-light absorbing part, which surface is placed on a side close to the sheet-shaped substrate part.

14. A lens sheet for diffusing light that enters the lens sheet from a rear side and allowing the diffused light to emerge from the lens sheet toward a viewing side, comprising:
- a sheet-shaped substrate part;
- a lens part formed on a light-incident-side surface of the sheet-shaped substrate part; and
- an extraneous-light absorbing part formed on a portion of the light-emergent-side surface of the sheet-shaped substrate part through which light converged by the lens part does not pass;

wherein
- (1) the extraneous-light absorbing part includes a base material, and a plurality of light-diffusing particles subjected to coloring treatment, incorporated in the base material,
- (2) the light-diffusing particles protrude partly through a surface of the base material for the extraneous-light absorbing part, and
- (3) the light-diffusing particles have particle diameters 1.25 to 15 times a thickness of the base material for the extraneous-light absorbing part.

15. A lens sheet for diffusing light that enters the lens sheet from a rear side and allowing the diffused light to emerge from the lens sheet toward a viewing side, comprising:
- a sheet-shaped substrate part;
- a lens part formed on a light-incident-side surface of the sheet-shaped substrate part; and
- an extraneous-light absorbing part formed on a portion of the light-emergent-side surface of the sheet-shaped substrate part through which light converged by the lens part does not pass;

wherein
- (1) the extraneous-light absorbing part includes a base material, and a plurality of light-diffusing particles subjected to coloring treatment, incorporated in the base material,
- (2) the light-diffusing particles protrude partly through a surface of the base material for the extraneous-light absorbing part, and
- (3) the light-diffusing particles have particle diameters 2 to 55 $\mu$m greater than a thickness of the base material for the extraneous-light absorbing part.

16. A lens sheet for diffusing light that enters the lens sheet from a rear side and allowing the diffused light to emerge from the lens sheet toward a viewing side, comprising:
- a sheet-shaped substrate part;
- a lens part formed on a light-incident-side surface of the sheet-shaped substrate part;
- an optical sheet placed on the viewing side of the light-emergent-side surface of the sheet-shaped substrate part; and an extraneous-light absorbing part formed on a portion of the light-emergent-side surface of the sheet-shaped substrate part through which light converged by the lens part does not pass;

wherein
- (1) the extraneous-light absorbing part includes a base material, and a plurality of light-diffusing particles subjected to coloring treatment, incorporated in the base material,
- (2) the light-diffusing particles protrude partly through a surface of the base material for the extraneous-light absorbing part, and
- (3) the light-diffusing particles in the extraneous-light absorbing part have a surface hardness that is lower than that of a surface of the optical sheet that faces the light-emergent-side surface of the sheet-shaped substrate part.

* * * * *